INVENTORS
EDWARD B. SAUBESTRE
ARNOLD D. ARNAUT
By Morton Amster
ATTORNEY

United States Patent Office 2,898,274
Patented Aug. 4, 1959

2,898,274

ELECTROPLATING OF ZINC-TIN ALLOYS

Edward B. Saubestre, Elmhurst, and Arnold D. Arnaut, Syosset, N.Y., assignors, by mesne assignments, to Sylvania Electric Products Inc., a corporation of Delaware Application August 8, 1955, Serial No. 526,860

22 Claims. (Cl. 204—43)

The present invention relates to plating solutions and baths, and in particular to a process and solutions for the electrodeposition of solderable alloys of zinc and tin. This is a continuation-in-part of application Serial Nos. 426,046 and 426,047, filed April 27, 1954.

It has long been recognized that an alloy of tin and zinc electrodeposited onto a basis metal, such as steel, affords excellent protection against corrosion. Particularly in the electronics industry, there has been a need for a substitute for cadmium which of recent times has become both scarce and expensive; such replacement material ideally should have the corrosion resistant properties of cadmium at a lower cost, coupled with the ready solderability of cadmium. In an attempt to meet such need, it has been suggested in the prior art to provide a tin-zinc alloy containing at least 50% tin and usually of the order of 70 to 85% tin, balance zinc. Such a high tin alloy provides definite advantages as compared to zinc, prominently in that it is readily soldered with tin-lead solder using non-corrosive conventional solder fluxes. However, these high tin alloys, of the order of 75% tin concentration, in general do not give the basis metal as good corrosion protection as does the pure zinc coating; and the relatively high concentration of tin serves to raise the plating metal cost to a value many times that of pure zinc.

Accordingly, it is broadly an object of the present invention to provide improved plating methods and baths obviating one or more of the aforesaid difficulties. Specifically, it is within the contemplation of the present invention to provide an electrodeposited alloy of zinc and tin having a quantity of tin sufficient to render the alloy solderable, while not appreciably altering the other chemical properties of zinc. To advantage, solderable zinc alloys deposited according to the present invention have the corrosion resistant properties comparable to that of pure zinc at plating metal costs much lower than that of conventional tin-zinc alloys or cadmium.

Broadly, the solderable type zinc-alloy plating bath is an unconventional combination of zinc and tin plating solutions. Caustic-cyanide zinc solutions and stannate type tin solutions have one thing in common, namely that the metal is present as the anion. The zinc is present as $Zn(CN)_4^=$ and $Zn(OH)_4^=$, while the tin is present as $Sn(OH)_6^=$. It has been found in conventional tin-zinc alloy baths that increasing the concentration of zinc salts in the bath increases the ease of deposition of zinc. This may be attributed to an increase in the zinc ion concentration for a fixed concentration of cyanide and hydroxide ions. Further, the cyanide content has been found to have no effect per se on the ease of deposition of tin. However, regarding the effect of hydroxide and cyanide on the ease of deposition of zinc, the situation is complicated by the fact that zinc is complexed with both hydroxide and cyanide. It is now generally believed that the plating of zinc occurs almost entirely from the hydroxide complex. An increase in hydroxide increases the content of the complex from which zinc plating occurs.

Such known plating baths as described in the literature and in commercial operating manuals on tin-zinc plating may be characterized as positive "free cyanide" baths. Free cyanide is conventionally defined as the difference between the amount of cyanide theoretically required to complex all of the zinc as cyanozincate and the total amount of cyanide present. Each mole of zinc present requires four moles of sodium or potassium cyanide to be complexed or in weight units:

Free sodium cyanide=Total sodium cyanide—3.0 (zinc content).

Free potassium cyanide=Total potassium cyanide—4.0 (zinc content).

Operating with such positive free cyanide baths, it was found that both high zinc content, of the order of 90%, and high cathode current efficiencies, likewise of the order of 90%, could not be maintained simultaneously. Further, soluble alloy anodes were found to dissolve poorly in such conventional baths. Since, as a practical matter it is usually more expensive to replace the metal content of a plating solution with a salt than with the metal itself, a commercially successful plating process usually requires soluble anodes.

Broadly, in accordance with the present invention, it has been found that these disadvantages may be overcome, as well as other objects realized by plating with zinc-tin baths having a negative-free cyanide content, that is less than zero free cyanide. For example, if a bath made of sodium salts contains less cyanide than three times the zinc content, the amount of free cyanide becomes negative. This definition of "negative free cyanide" is used in the present application. The conventional definition of free cyanide has no necessary bearing to the actual content of free cyanide present in the bath, since the zinc may be partially complexed with hydroxide. Thus, a negative free cyanide bath may actually have some free cyanide present. It has been found that by using negative free cyanide baths, it is possible to deposit alloys high in zinc content at high cathode current densities. Further, zinc-tin alloy anodes dissolve readily in such baths.

With certain limitations to be detailed hereinafter, the concept of the negative free cyanide baths according to the present invention may be used to deposit a solderable zinc alloy which is relatively high in zinc concentration and contains sufficient tin alloy material to permit ready solderability. The solderable zinc alloy has a white matte finish which although susceptible to finger staining exhibits the primary requisites of corrosion resistance and solderability at low cost.

The above brief description, as well as further objects, features and advantages of the present invention will be best appreciated by reference to the following detailed description of presently preferred formulations and methods, when taken in conjunction with the accompanying drawings wherein.

In the mentioned copending application, there are disclosed baths which were found previously to be stable chemically and permitted continued plating operations at high cathode current efficiencies (better than 85%) and high zinc alloy content (better than 87% zinc). The following formulations were listed:

*Example 1*

| | |
|---|---|
| $Zn(CN)_2$ | 22.5 g./l. |
| $Na_2SnO_3 \cdot 3H_2O$ | 67 g./l. |
| NaCN | 12 g./l. |
| NaOH | 32 g./l. |
| Temperature | 65° C. |
| Cathode current density | 20 amp./sq. ft. (optimum) 5–40 amp./sq. ft. (useful range) |

*Example 2*

| | |
|---|---|
| ZnO | 15.5 g./l. |
| $Na_2SnO_3 \cdot 3H_2O$ | 67 g./l. |
| NaCN | 30 g./l. |
| NaOH | 20 g./l. |
| Temperature | 65° C. |
| Cathode current density | 20 amp./sq. ft. (optimum) 5–40 amp./sq. ft. (useful range) |

These baths, based upon sodium formulations, produced alloy platings whose composition did not change over extensive use of the bath, and which compositions were deposited at high cathode current efficiencies.

It was further disclosed that baths based upon a potassium formulation were capable of successful operation at higher current densities. Examples of the formulations of such potassium baths are as follows:

*Example 3 using zinc cyanide*

| | |
|---|---|
| $Zn(CN)_2$ | 27 g./l. |
| $K_2SnO_3 \cdot 3H_2O$ | 100 g./l. |
| KOH | 60 g./l. |
| KCN | 17.5 g./l. |
| Temperature | 65° C. |
| Cathode current density | 50 amp./sq. ft. (optimum) 20–100 amp./sq. ft. (useful range) |

*Example 4 using zinc oxide*

| | |
|---|---|
| ZnO | 18.7 g./l. |
| $K_2SnO_3 \cdot 3H_2O$ | 100 g./l. |
| KOH | 34 g./l. |
| KCN | 47 g./l. |
| Temperature | 65° C. |
| Cathode current density | 50 amp./sq. ft. (optimum) 20–100 amp./sq. ft. (useful range) |

The potassium baths were disclosed as being stable and capable of sustaining operation at high cathode current efficiency of the order of 85% at higher current densities than in the sodium baths, while producing alloy platings having a zinc content in excess of 87%.

The criteria established for the baths of the copending application, was that the resulting baths have a negative free cyanide content. This was achieved with sodium formulations by keeping the sodium cyanide content in the bath between zero and three times the zinc metal content; and with potassium formulations by keeping the potassium cyanide content between zero and four times the zinc metal content of the bath. In both the sodium and potassium formulations, it was necessary that the hydroxide content of the bath should be at least great enough to assure that all of the zinc is complexed. The above requirements were in weight terms as follows: In the sodium bath formulation, the total sodium hydroxide content in grams per liter should not be less than 2.44 times the quantity defined as the zinc content in grams per liter minus one-third the total sodium cyanide content in grams per liter. The maximum amount recommended was 150 grams per liter of sodium hydroxide.

When the bath formulation was based upon the use of potassium salts the total recommended amount of potassium hydroxide in grams per liter should be no less than 3.43 times the quantity defined as the zinc content in grams per liter, minus one-fourth the total of sodium cyanide content in grams per liter. The maximum value of potassium hydroxide recommended was also 150 grams per liter.

As a result of further work, it was found that the concept of negative free cyanide was insufficient to completely define the areas for the deposit of zinc-tin alloys. At levels of sodium hydroxide of the order of 10 to 30 grams per liter, it was reconfirmed that high zinc content alloy deposits could be obtained based upon the broad concepts of said copending application. However, at higher concentrations of sodium hydroxide, specifically in the range of 75 to 150 grams per liter, the zinc content of the alloy deposit was found to always be high and essentially independent of the cyanide concentration. Further, at very low levels of total sodium cyanide, specifically in the range of zero to 10 grams per liter, in regions of sodium hydroxide concentrations of 5 to 30 grams per liter, the zinc content of the deposit became quite small, despite the fact that the bath was a formulation based upon the negative free cyanide theory as defined in said copending application.

Several criteria have been established for preferred bath formulations in accordance with the present invention. Primary among these requirements is that the zinc content of the alloy deposit should be no less than 75% and no greater than 95%. Below 75% zinc in the zinc-tin alloy, the desired anodic corrosion protection decreases markedly and the alloy deposit takes on the general appearance of a tin deposit. Further, the metal cost of deposits having in excess of 25% tin is proportionately increased for higher tin contents. On the other hand, above 95% zinc in the zinc-tin alloy, the solderability is impaired. A further and equally important requirement is that the cathode current efficiencies be as high as possible with the ultimum of 100% to be closely approached. From a commercial standpoint, cathode current efficiencies over 60% are considered acceptable, if such efficiencies prevail at current densities of up to 25 amperes per square foot for sodium formulation baths and up to 50 amperes per square foot for potassium formulation baths. Finally, to avoid the expense of replenishing the metal content of the plating bath with a salt in lieu of the metal itself, it is important that for the desired range of zinc content and cathode current efficiency, the anodes should readily dissolve and replenish the metal ion content of the bath as needed.

In Figs. 1 to 10 inclusive, there are shown plots of the percentage of zinc in the alloy (see Figs. 1, 3, 5, 7 and 9) and the cathode current efficiency (see Figs. 2, 4, 6, 8 and 10) for sodium formulation baths at a fixed concentration of tin of 30 grams per liter, a fixed current density of 20 amperes per square foot and various values of zinc concentration between 2.5 grams per liter to 16 grams per liter. Although these graphs are based upon sodium formulations, their interpolation to baths of potassium salts should be readily understood by those skilled in the art. That is, when using potassium salts in lieu of sodium salts, the amounts required are increased to an extent proportional to the ratio of their molecular weights. Baths formulated with sodium salts are inexpensive to install and maintain, and such sodium salts are of adequate quality and readily available. The principal disadvantage of baths based upon sodium formulations is that of low plating speed and the rapid fall-off of current efficiency at densities exceeding 20 to 25 amperes per square foot. In that the present process may find application in the replacement of zinc, cadmium or tin-zinc plating processes, plating speeds should be comparable to known processes, in order to minimize changes in layout and time cycles. Accordingly, it is equally within the contemplation of the present invention to cover baths formulated according to the instant disclosure using salts of potassium for achieving the desired concentration of cyanide and hydroxide ion.

Figure 1:
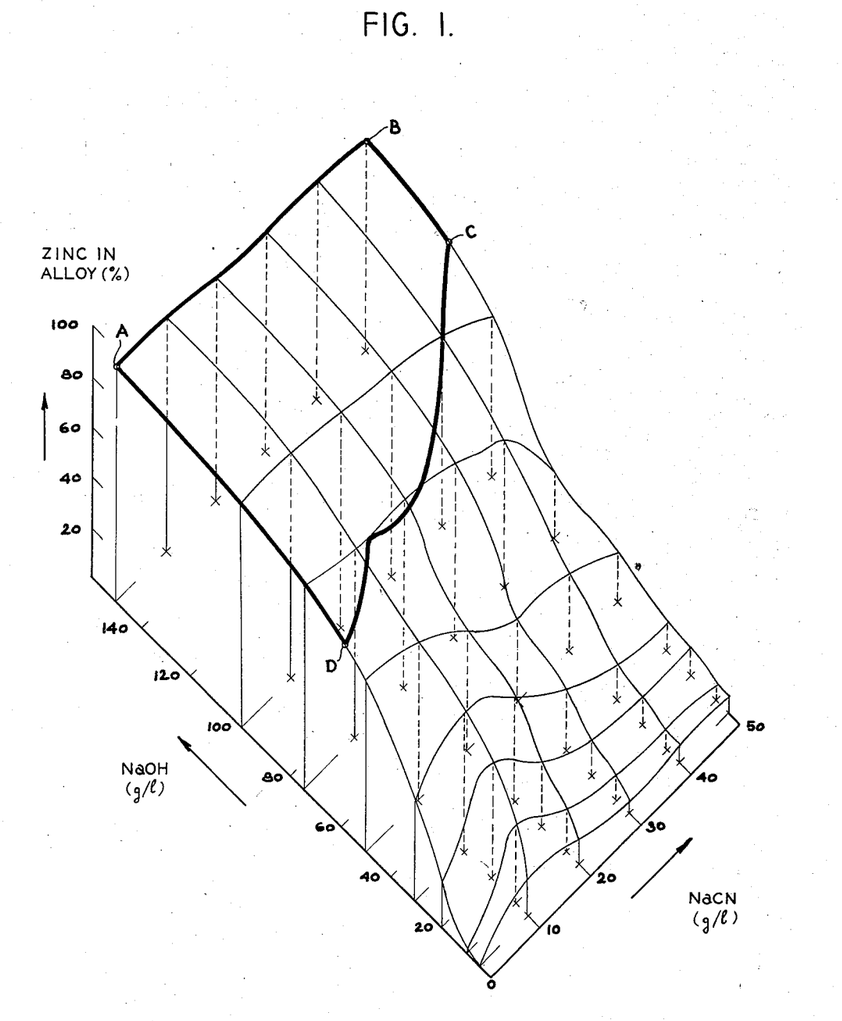
Fig. 1 is a plot of the percentage of zinc in the solderable zinc-tin alloy of the present invention for various values of sodium hydroxide and sodium cyanide in the plating bath, with a zinc concentration of 2.5 grams per liter, a tin concentration of 30 grams per liter and a current density of 20 amperes per square foot.
Figure 2:
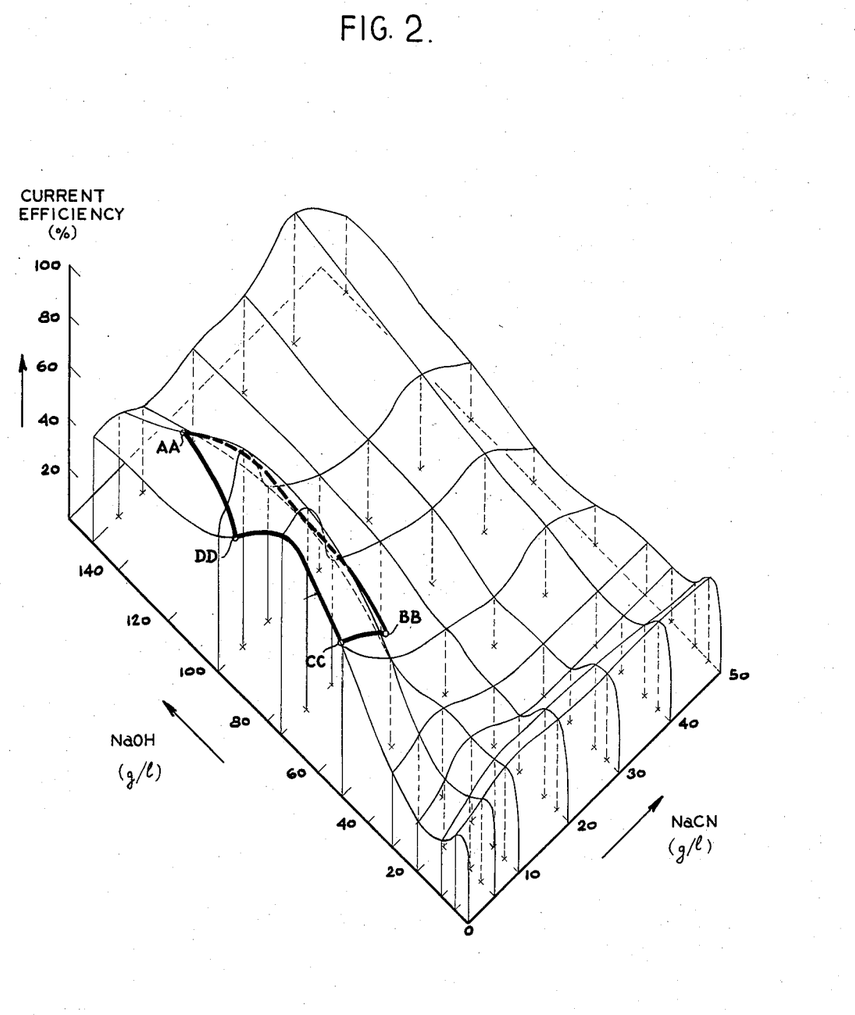
Fig. 2 is a plot of cathode current efficiency for various values of sodium hydroxide and sodium cyanide with the same zinc and tin concentrations and current density as for Fig. 1.

Figs. 1, 3, 5, 7 and 9 illustrate the desired range of zinc content in the deposit, namely 75–95%. Figs. 2, 4, 6, 8 and 10 illustrate the desired range of cathode current efficiency, namely, 60–100%. Referring now specifically to Figs. 1 and 2, there are shown respectively plots of zinc content of the deposit and cathode current efficiency for various values of hydroxide and cyanide content for a zinc concentration of 2.5 grams per liter, a tin concentration of 30 grams per liter and a current density of 20 amperes per square foot. In Fig. 1, the region enclosed by the heavy black lines AB, BC, CD, and HA having the coordinates A, C, C and D include formulations for depositing a solderable alloy containing between 75 and 95% zinc. As is well understood by conventional coordinate notation, increasing values of sodium cyanide are measured along the abscissa or X-axis from the zero reference, increasing values of sodium hydroxide are measured along the ordinate or Y-axis from the zero reference, and the percentage of zinc in the alloy is measured along the Z-axis extending at right angles to the plane of the two coordinate system.

The approximate coordinates of the points defining the prescribed zinc content range in Fig. 1 are as follows:

A—0 grams per liter sodium cyanide, 150 grams per liter sodium hydroxide, and 95% zinc in the alloy.

B—50 grams per liter sodium cyanide, 150 grams per liter sodium hydroxide, and 85% zinc in the alloy.

C—50 grams per liter sodium cyanide, 120 grams per liter sodium hydroxide and 75% zinc in alloy.

D—0 grams per liter sodium cyanide, 61 grams per liter sodium hydroxide and 75% zinc in alloy.

Although the solid line of Fig. 1 encloses a preferred region, it is to be expressly understood that no sharp transition occurs in the zinc content in the alloy as the outer limits of the preferred regions are approached. Rather the limits define a threshold region wherein the zinc content is other than within the optimum range.

In Fig. 2 there is shown a graph of cathode current efficiency plotted in the third dimension for varying values of sodium cyanide and sodium hydroxide shown along the abscissa and ordinate of the two coordinate systems. In the region enclosed by the solid heavy line having the coordinates AA, BB, CC and DD, the cathode current efficiency is in excess of 60%.

The approximate coordinates of the points defining the desired region of high current efficiency are as follows:

AA—5 grams per liter of sodium cyanide, 125 grams per liter of sodium hydroxide, and a current efficiency of 60%.

BB—6 grams per liter of sodium cyanide, 55 grams per liter of sodium hydroxide and a current efficiency of 60%.

CC—0 grams per liter of sodium cyanide, 51 grams per liter of sodium hydroxide and a current efficiency of 60%.

DD—0% of sodium cyanide, 93 grams per liter of sodium hydroxide and a current efficiency of approximately 60%.

It will be appreciated by a consideration of Fig. 2 that the cathode current efficiency for baths containing approximately 2.5 grams per liter of zinc is at the lower limit of the prescribed range.

By conjoint reference to Figs. 1 and 2, it is seen that there is a small overlap or common region. Within this common region, it is possible to deposit a zinc-tin alloy containing between 75 and 95% zinc at a current efficiency in excess of 60%. However, in Figs. 1 and 2, the common area is so small and critical that it is difficult to operate a commercial plating bath within this common region. Further, it is exceptionally difficult to accurately control the formulation of this bath, since any drop in zinc concentration is appreciable as compared to the stated concentration of 2.5 grams per liter. As will be appreciated by progressively inspecting Figs. 3 and 4, Figs. 5 and 6, Figs. 7 and 8, and Figs. 9 and 10, it will be understood that Figs. 1 and 2 represent a formulation with zinc concentration slightly below the lowermost limit for operation in accordance with the present invention.

Figure 3:
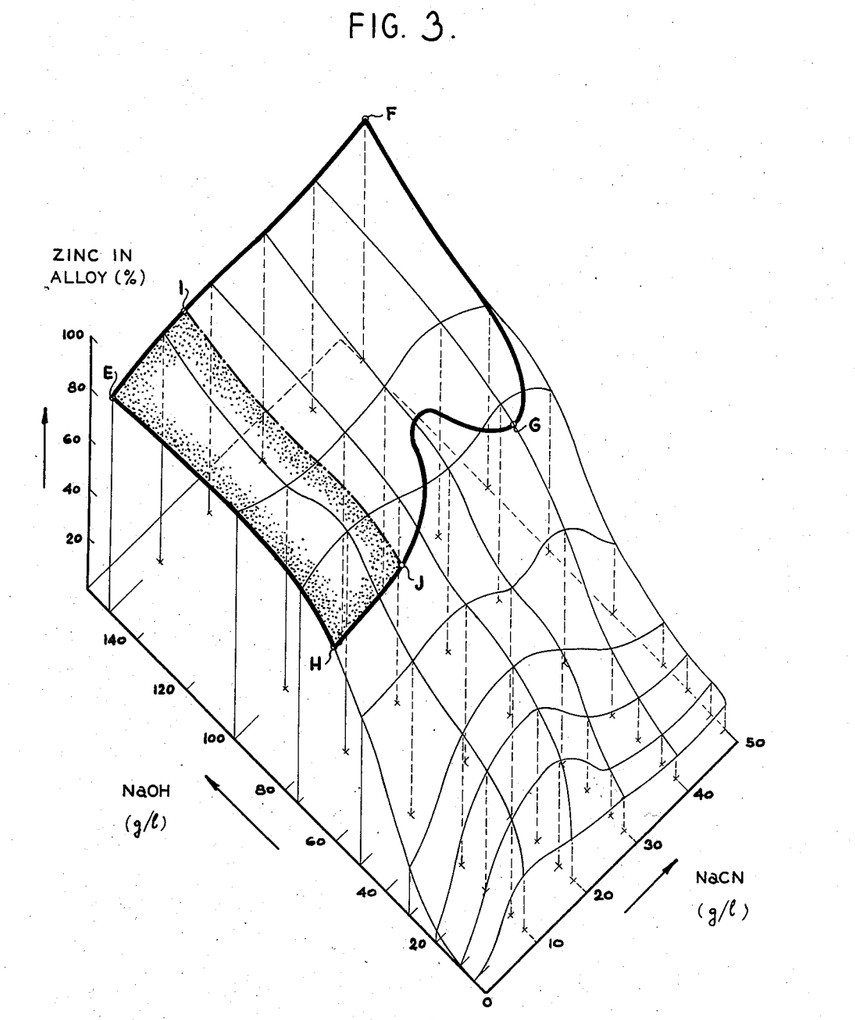
Fig. 3 is a plot of the percentages of zinc in the solderable zinc-tin alloy for various values of sodium hydroxide and sodium cyanide in the plating bath with a zinc concentration of 5 grams per liter, a tin concentration of 30 grams per liter and a current density of 20 amperes per square foot.
Figure 4:
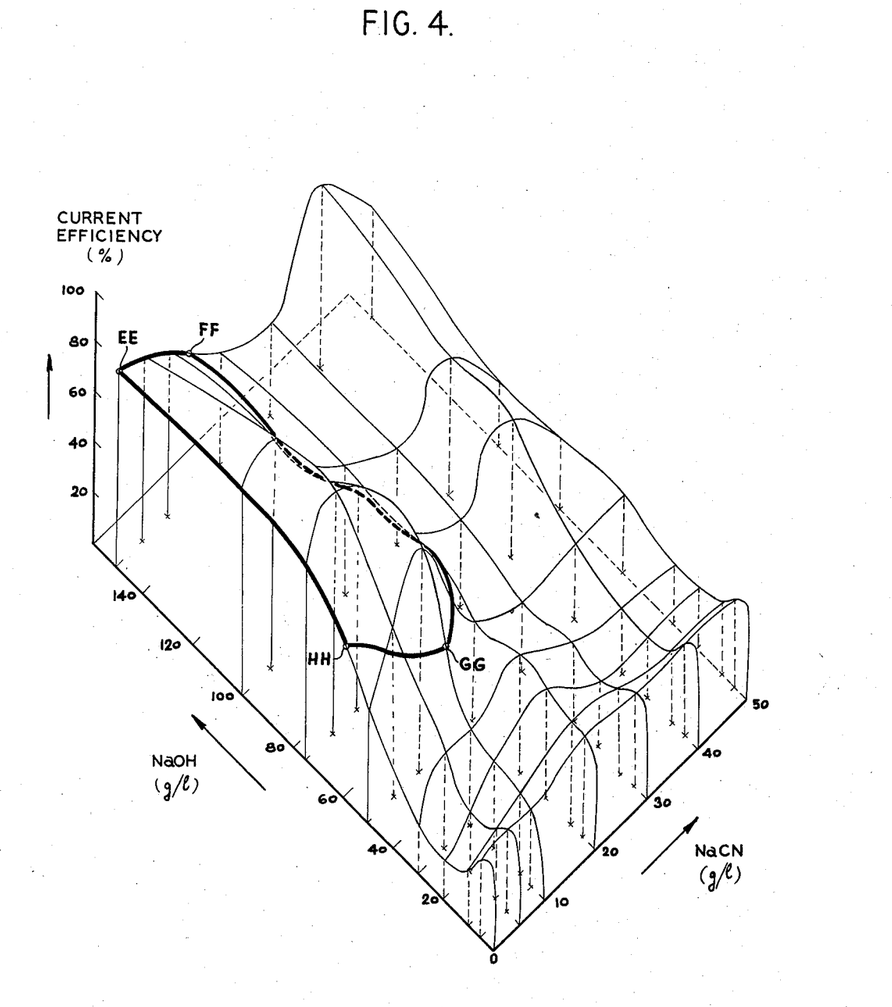
Fig. 4 is a plot of the cathode current of efficiency for various values of sodium hydroxide and sodium cyanide in the plating bath with the same zinc and tin concentration and current density as for Fig. 3.

Referring now specifically to Figs. 3 and 4, there are shown respectively plots of zinc content in the plating and cathode current efficiency for various values of hydroxide and cyanide content for a zinc concentration of 5 grams per liter, a tin concentration of 30 grams per liter and a current density of 20 amperes per square foot. In Fig. 3, the region enclosed by the heavy black lines EF, FG, GH, HE, and having the coordinates E, F, G, and H includes formulations for depositing a solderable alloy containing between 75 and 95% zinc.

The approximate coordinates of the points defining the prescribed zinc content range of Fig. 3 are as follows:

E—Zero grams per liter sodium cyanide, 150 grams per liter of sodium hydroxide and 82% zinc in the alloy.

F—50 grams per liter sodium cyanide, 150 grams per liter sodium hydroxide and 95% zinc in the alloy.

G—40 grams per liter sodium cyanide, 71 grams per liter sodium hydroxide and 75% zinc in the alloy.

H—Zero grams per liter sodium cyanide, 61 grams per liter sodium hydroxide and 75% zinc in the alloy.

Fig. 4 is a plot or graph of cathode current efficiency, drawn in three coordinates, for varying values of sodium cyanide and sodium hydroxide shown along the abscissa and ordinate of the two coordinate system. In the region enclosed by the solid heavy line having the coordinates EE, FF, GG, HH, the cathode current efficiency is in excess of 60%.

The approximate coordinates of the points defining the desired region of high current efficiency in Fig. 4 are as follows:

EE—Zero grams per liter sodium cyanide, 150 grams per liter sodium hydroxide, and a current efficiency of 75%.

FF—13 grams per liter of sodium cyanide, 150 grams per liter sodium hydroxide, and 60% current efficiency.

GG—10 grams per liter sodium cyanide, 40 grams per liter sodium hydroxide, and 60% current efficiency.

HH—Zero grams per liter of sodium cyanide, 59 grams per liter sodium hydroxide, and a current efficiency of 60%.

By conjoint reference to Figs. 3 and 4, it is seen that there is a fairly extensive overlap or common region. In Fig. 3 this common region is shaded and enclosed by the solid line EI, the dot-dash line IJ, the solid line JH, and the solid line HE. Within this overlapping region, all formulations are capable of depositing an alloy having between 75 to 95% zinc with a current efficiency in excess of 60%. It is to be noted that the cathode current efficiency is not exceptionally high through all of the region, except for the baths having a large hydroxide content.

The approximate coordinates of the points at opposite ends of the dot-dash line IJ in Fig. 3 are as follows:

I—15 grams per liter sodium cyanide, 150 grams per liter sodium hydroxide, and 91% zinc in the alloy.

J—15 grams per liter sodium cyanide, 62 grams per liter sodium hydroxide and 75% zinc in the alloy.

Figure 5:
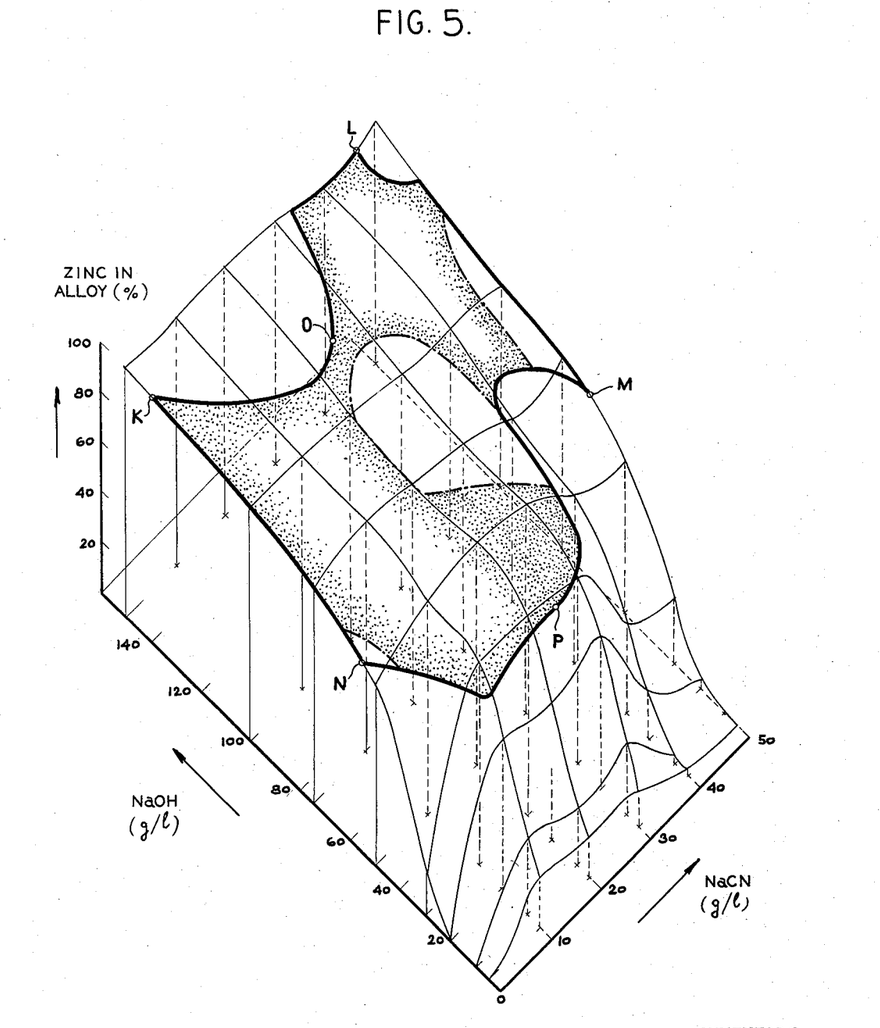
Fig. 5 is a plot of the percentages of zinc in the solderable zinc-tin alloy for various values of sodium hydroxide and sodium cyanide in the plating bath with a zinc concentration of 8 grams per liter, a tin concentration of 30 grams per liter and current density of 20 amperes per square foot.
Figure 6:
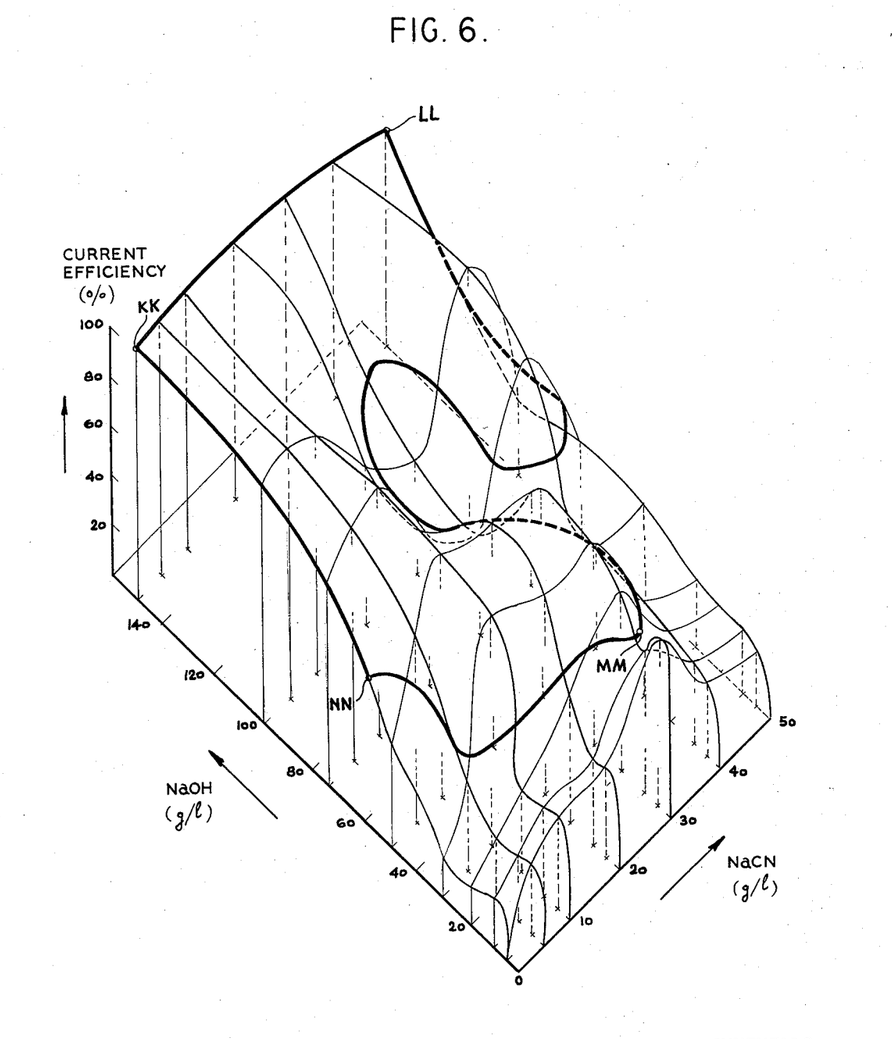
Fig. 6 is a plot of the cathode current efficiency for various values of sodium hydroxide and sodium cyanide in the plating bath with the zinc concentration, tin concentration and current density the same as for Fig. 5.

In Figs. 5 and 6 there are shown respectively plots of zinc content in the plating and cathode current efficiency for various values of hydroxide and cyanide content for a zinc concentration of 8 grams per liter, a tin concentration of 30 grams per liter and a current density of 20 amperes per square foot. In Fig. 5, the region enclosed by the heavy solid lines KL, LM, MN, NK and having the coordinates K, L, M, N include formulations for depositing a solderable alloy containing between 75 and 95% zinc. By reference to Figs. 1 and 3 it will be observed that this region is appreciably larger than the regions for lower zinc concentrations.

The approximate coordinates of the points defining the prescribed zinc content range in Fig. 5 are as follows:

K—Zero grams per liter sodium cyanide, 140 grams per liter sodium hydroxide, 95% zinc in the alloy.

L—45 grams per liter sodium cyanide, 150 grams per liter sodium hydroxide, 95% zinc in the alloy.

M—50 grams per liter sodium cyanide, 66 grams per liter sodium hydroxide, 75% zinc in the alloy.

N—Zero grams per liter sodium cyanide, 56 grams per liter sodium hydroxide, 75% zinc in the alloy.

O—26 grams per liter sodium cyanide, 116 grams per liter sodium hydroxide and 92% zinc in the alloy.

P—24 grams per liter sodium cyanide, 25 grams per liter sodium hydroxide and 79% zinc in the alloy.

In Fig. 6 there is shown a graph of cathode current efficiency plotted in three coordinates for varying values of sodium cyanide and sodium hydroxide shown along the abscissa and ordinate of the two coordinate system. In the region enclosed by the solid heavy lines having the coordinates KK, LL, MM, NN, the cathode current efficiency is in excess of 60%.

The approximate coordinates of the points defining the desired region of high current efficiency in Fig. 6 are as follows:

KK—Zero grams per liter sodium cyanide, 150 grams per liter sodium hydroxide, approximately 100% current efficiency.

LL—50 grams per liter sodium cyanide, 150 grams per liter sodium hydroxide, and a current efficiency of 88%.

MM—31 grams per liter sodium cyanide, 13 grams per liter sodium hydroxide and a current efficiency of 60%.

NN—Zero grams per liter sodium cyanide, 60 grams per liter of sodium hydroxide and a current efficiency of 60%.

By conjoint reference to Figs. 5 and 6, it is seen that there is a rather substantial overlap or common region enclosed within the heavy solid lines and the dot-dash lines. Within the common area or region which is shaded, a commercial plating bath may be operated which is capable of depositing a zinc-tin alloy having a zinc concentration of between 75 and 95% at a current efficiency in excess of 60%.

Figure 7:
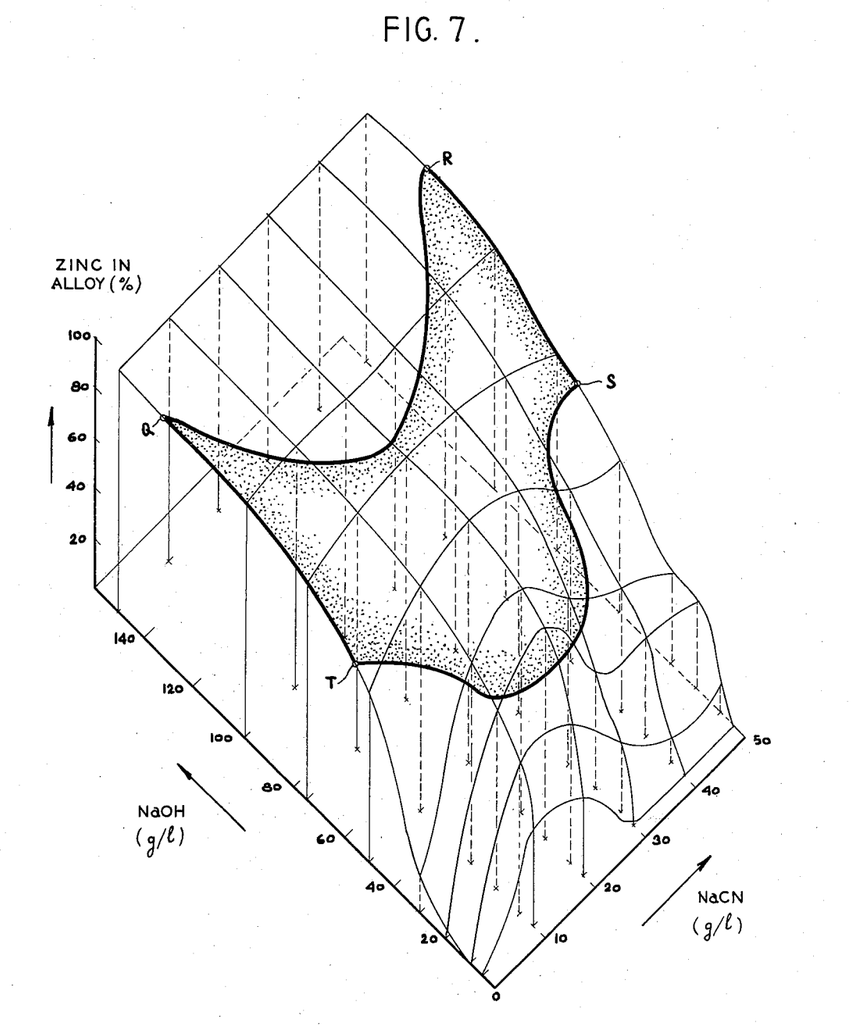
Fig. 7 is a plot of the percentage of zinc in the solderable zinc-tin alloy for various values of sodium hydroxide and sodium cyanide in the plating bath with a zinc concentration of 12 grams per liter, a tin concentration of 30 grams per liter and a current density of 20 amperes per square foot.
Figure 8:
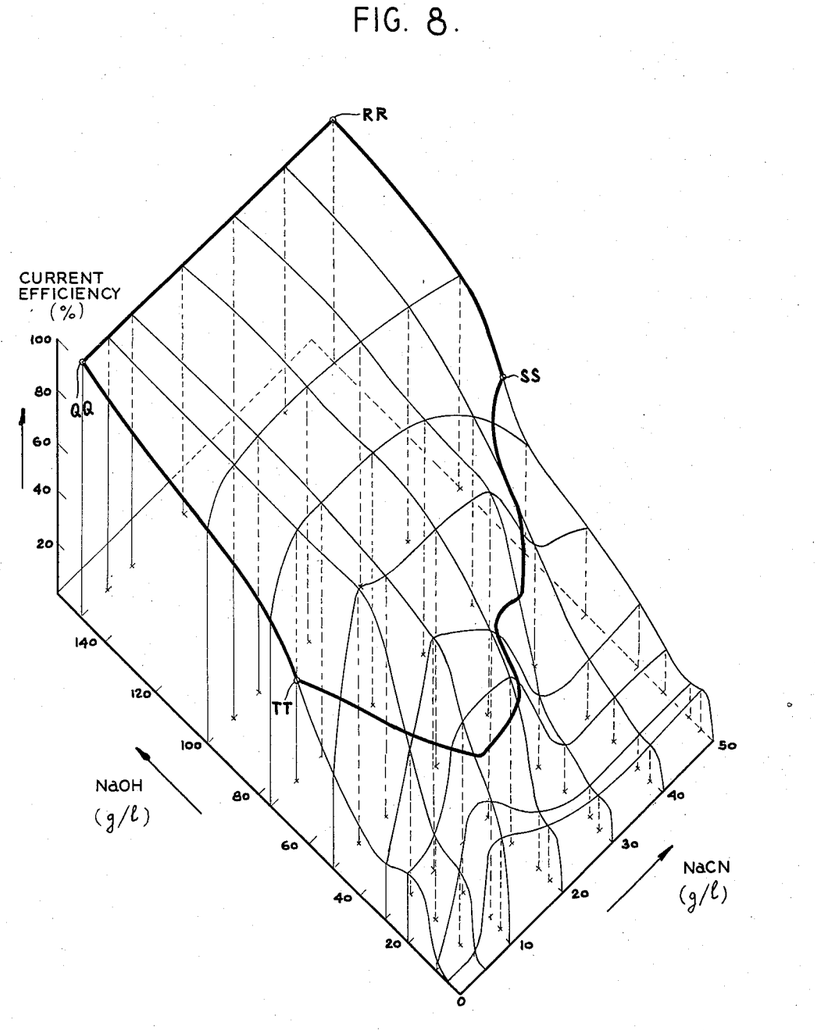
Fig. 8 is a plot of the cathode current efficiency for various values of sodium hydroxide and sodium cyanide in the plating bath with the zinc concentration, tin concentration and current density the same as for Fig. 7.

Referring specifically now to Figs. 7 and 8, there are shown respectively plots of the zinc content in the plating and the cathode current efficiency for various values of hydroxide and cyanide content for a zinc concentration of 12 grams per liter, a tin concentration of 30 grams per liter and a current density of 20 amperes per square foot. As before, the sodium cyanide concentration has been studied between zero and 50 grams per liter, and the sodium hydroxide concentration has been studied between approximately zero and 150 grams per liter. In Fig. 7 the region enclosed by heavy solid lines QR, RS, ST, TQ and having the coordinates Q, R, S, T include formulations for depositing solderable zinc alloy containing between 75 and 95% zinc; as compared to the high zinc concentration regions of Figs. 1, 3 and 5 it will be observed that the region of Fig. 7 is still more substantial.

The approximate coordinates of the points defining the prescribed zinc content range in Fig. 7 are as follows:

Q—Zero grams per liter sodium cyanide, 134 grams per liter, sodium hydroxide, 95% zinc in the alloy.

R—50 grams per liter sodium cyanide, 128 grams per liter sodium hydroxide, and 95% in alloy.

S—50 grams per liter sodium cyanide, 66 grams per liter sodium hydroxide, and 75% zinc in the alloy.

T—Zero grams per liter sodium cyanide, 55 grams per liter sodium hydroxide and 75% zinc in the alloy.

In Fig. 8 there is shown a graph of cathode current efficiency plotted in three coordinates for varying values of sodium cyanide and sodium hydroxide for the formulations of Fig. 7. In the region enclosed by the solid heavy lines having the coordinates QQ, RR, SS, TT, the cathode current efficiency is in excess of 60%.

The approximate coordinates of the points defining the desired high current efficiency in Fig. 8 are as follows:

QQ—Zero grams per liter sodium cyanide, 150 grams per liter sodium hydroxide and current efficiency of approximately 100%.

RR—50 grams per liter sodium cyanide, 150 grams per liter sodium hydroxide and a current efficiency of approximately 98%.

SS—50 grams per liter sodium cyanide, 84 grams per liter sodium hydroxide and a current efficiency of 60%.

TT—Zero grams per liter sodium cyanide, 64 grams per liter sodium hydroxide and a current efficiency of 60%.

By conjoint inspection of Figs. 7 and 8, it will be seen that the entire high zinc content region of Fig. 7 has overlapping portions in the high current efficiency region of Fig. 8 and accordingly all formulations suitable for depositing high zinc shown in Fig. 7 have current efficiencies in excess of 60%. It will be appreciated that the range of formulations is exceptionally broad and that it is thus possible to operate a commercial plating bath without extreme control over variations in the bath formulation.

Figure 9:
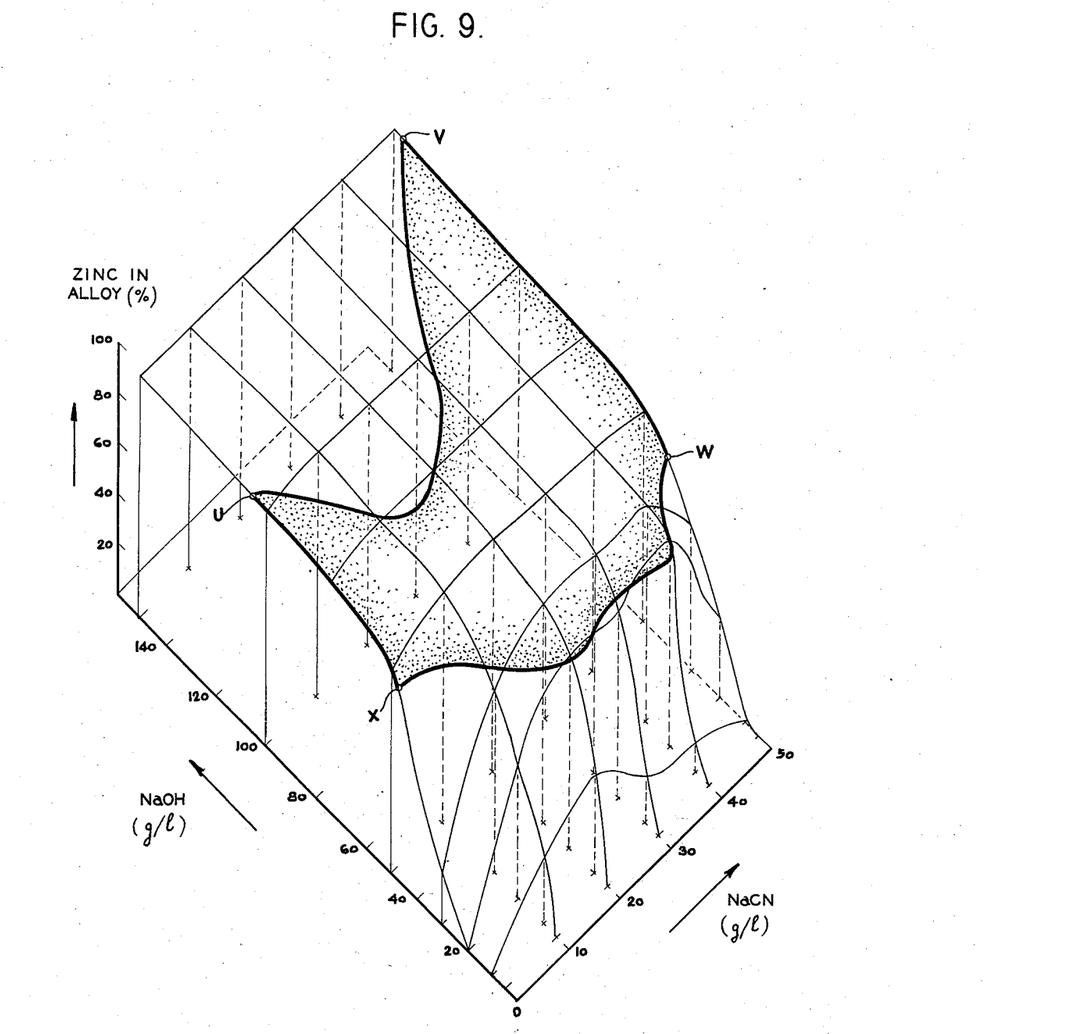
Fig. 9 is a plot of the percentages of zinc in the solderable zinc-tin alloy for various values of sodium hydroxide and sodium cyanide in the plating bath with a zinc concentration of 16 grams per liter, a tin concentration of 30 grams per liter and a current density of 20 amperes per square foot.
Figure 10:
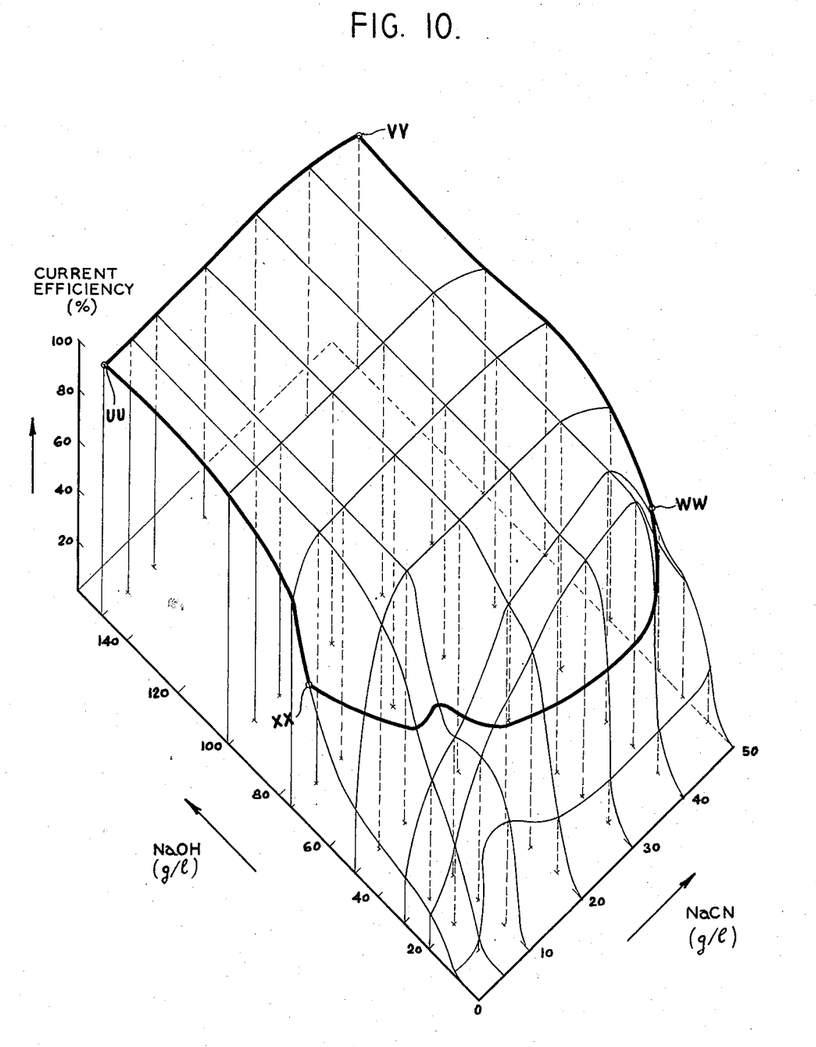
Fig. 10 is a plot of the cathode current efficiency for various values of sodium hydroxide and sodium cyanide in the plating bath with the zinc and tin concentrations and current density the same as for Fig. 9.

Referring now to Figs. 9 and 10, there are shown respectively graphs of zinc content in plating and cathode current efficiency for various values of hydroxide and cyanide content for a zinc concentration of 16 grams per liter, a tin concentration of 30 grams per liter, and a current density of 20 amperes per square foot. In Fig. 9, the region enclosed by the heavy black lines UV, VW, WX, and XU having the coordinates U, V, W, X include formulations for depositing a solderable alloy containing between 75 and 95% zinc. As compared to the showings of Figs. 1, 3 and 5, it will be appreciated that the region of Fig. 9 is somewhat more extensive, and comparable to the region shown in Fig. 7.

The approximate coordinates of the points defining the prescribed high zinc content range in Fig. 9 are as follows:

U—Zero grams per liter of sodium cyanide, 105 grams per liter sodium hydroxide and 95% zinc in the alloy.

V—50 grams per liter sodium cyanide, 148 grams per liter sodium hydroxide, and 95% zinc in the alloy.

W—50 grams per liter sodium cyanide, 40 grams per liter sodium hydroxide and 75% zinc in the alloy.

X—Zero grams per liter sodium cyanide, 47 grams per liter sodium hydroxide and 75% zinc in the alloy.

In Fig. 10 there is shown a plot of cathode current efficiency for varying values of sodium cyanide and sodium hydroxide for the parameters established in conjunction with Fig. 9. In the region enclosed by the solid heavy lines having the coordinates UU, VV, WW, and XX the cathode current efficiency is in excess of 60%.

The approximate coordinates of the points defining the desired region of high current efficiency in Fig. 10 are as follows:

UU—Zero grams per liter sodium cyanide, 150 grams per liter sodium hydroxide and a current efficiency of approximately 100%.

VV—50 grams per liter sodium cyanide, 150 grams per liter sodium hydroxide, and a current efficiency of approximately 95%.

WW—50 grams per liter sodium cyanide, 33 grams per liter sodium hydroxide and a current efficiency of 60%.

XX—Zero grams per liter sodium cyanide, 70 grams per liter sodium hydroxide and a current efficiency of 60%.

By conjoint reference to Figs. 9 and 10 it will be seen that the high plating region of Fig. 9 is completely contained within the region of high current efficiencies and accordingly all solutions contained within the shaded region UV, VW, WX, and XY of Fig. 9 are acceptable for producing a zinc tin alloy containing between 75 and 95% zinc at a current efficiency in excess of 60%.

It is to be stressed that the graphs of Figs. 1 to 10 inclusive are merely intended for illustrative purposes and do not completely cover the operative regions according to the present disclosure. Further, the graphs merely illustrative the sodium formulation baths and are for a fixed concentration of tin and a fixed current density. The broader concepts of the present invention involve the use of either a sodium or potassium formulation bath which will deposit an alloy containing between 75 and 95% zinc balance tin, at cathode efficiencies of 60 to 100%, and at current densities of up to 25 amperes per square foot for sodium baths and 50 amperes for potassium baths, with the zinc concentration varying between the limits of 5 and 50 grams per liter and the tin concentration varying between the limits of 15 to 75 grams per liter. For all formulations, the total amount of hydroxide and cyanide content present should be sufficient to complex all of the zinc as a complex zinc radical.

The optimum temperature of operation is 65° C. with a range of from 45 to 85° C. At temperatures lower than 60° C., the current efficiency falls off sharply. Increasing the temperature will not adversely affect the efficiency, but will increase the rate of decomposition of salts and the heating costs.

For all formulations in accordance with the present invention, it is possible to employ soluble anodes to replenish the metal content of the plating solution. The optimum composition of the anodes is 75% by weight zinc and 25% by weight tin; anode current density and current efficiency are such that all of the tin and part of the zinc plated out of the solution is replenished. The balance of the zinc may customarily be replaced by adding zinc oxide to the solution. The treatment of the anodes is detailed in copending application Serial No. 426,046, filed April 27, 1954 and assigned to the assignee of the present invention, and involves placing the anodes in the plating tank and increasing the tank current until all the anodes are polarized. The tank current is then reduced to its proper value for plating. For the formulations previously disclosed, anodes may be operated at high efficiencies in excess of 85% at ten amperes per square foot for sodium baths and at 25 amperes per square foot for potassium baths. The polarizing current density for newly cast anodes varies. In an unagitated bath, the polarizing current density is about 65 amperes per square foot for sodium baths and 100 amperes per square foot for potassium baths at the optimum temperature of 65° C.

It has been found that the cyanide content and hydroxide content are somewhat interdependent. From zero to five grams per liter sodium cyanide, the hydroxide content should be greater than 60 grams per liter sodium hydroxide; from 5 to 10 grams per liter sodium cyandie the hydroxide content should be greater than 40 grams per liter sodium hydroxide; and for 10 grams per liter sodium cyanide to three times the zinc concentration, the hydroxide content should be greater than 25 grams per liter sodium hydroxide. Similarly, for potassium formulations between zero and 6.5 grams per liter potassium cyanide, the hydroxide content should be greater than 75 grams per liter potassium hydroxide; from 6.5 grams to 13 grams per liter sodium cyanide, the hydroxide content should be greater than 55 grams per liter potassium hydroxide; and from 10 grams per liter potassium cyanide to four times the zinc concentration, the hydroxide content should be greater than 35 grams per liter potassium hydroxide. At all times the total amount of hydroxide and cyanide present should be sufficient to fully dissolve the zinc by complexing action.

It has been further found that for zinc contents in excess of 8 grams per liter, there is an upper limit to the hydroxide content. Specifically for 8 grams per liter zinc, the upper limit is approximately 125 grams per liter sodium hydroxide (or, 175 grams per liter of potassium hydroxide); for 12 grams per liter of zinc, the upper limit is about 100 grams per liter of sodium hydroxide (or, 140 grams per liter of potassium hydroxide); and for 16 grams per liter of zinc, the upper limit is about 75 grams per liter sodium hydroxide (or, 105 grams per liter of potassium hydroxide). All of the above formulations are based upon the sodium cyanide content carrying between zero and 25 grams per liter. With increasing cyanide concentration the upper limit for the hydroxide content increases to approximately 150 grams per liter at zero free cyanide. By interpolating the above results, appropriate limits may be found for baths based upon potassium formulations.

The solderable zinc alloy produced in accordance with the present baths and methods has a white matte finish which is rather prone to finger staining. In salt-fog atmosphere the alloy is also prone to white salt formation although to a slightly lesser extent that pure zinc. For these reasons it may be desirable to coat the alloy with appropriate finishing dips. A conventional dip for this purpose consists of immersing the alloy in 1% by weight of nitric acid, which produces a very thin oxide film of a pleasing gray color. This film suppresses finger staining while not interfering with solderability and any cyanide left after plating and rinsing is neutralized by this conventional dip. Similarly chromate conversion coatings may be applied to the deposits, but unlike the nitric acid dips, the chromate film increasingly interferes with solderability as its thickness is increased.

Numerous modifications and substitutions in the present process and baths will occur to those skilled in the art. Accordingly, the appended claim should be given a latitude of interpretation consistent with the disclosure; at times certain features of the invention will be used without a corresponding use of other features.

What we claim is:

1. A cyanide-type of plating bath for depositing a zinc-tin alloy comprising in solution zinc, tin, a cyanide ion source and a hydroxide ion source, the cyanide ion being present in an amount less than that required to complex all of the zinc as cyanozincate ion, the total amount of cyanide ion and hydroxide ion being sufficient to complex all of the zinc.

2. A cyanide-type of plating bath for depositing a zinc-tin alloy comprising in solution zinc, tin, sodium cyanide and sodium hydroxide, the cyanide ion being present in an amount less than that required to complex all of the zinc as cyanozincate ion, the total amount of cyanide ion and hydroxide ion being sufficient to complex all of the zinc.

3. A cyanide-type of plating bath for depositing a zinc-tin alloy comprising in solution zinc, tin, potassium cyanide and potassium hydroxide, the cyanide ion being present in an amount less than that required to complex all of the zinc as cyanozincate ion, the total amount of cyanide ion and hydroxide ion being sufficient to complex all of the zinc.

4. A plating solution for electrolytically forming a zinc-tin alloy containing about 87 percent zinc comprising an alkaline cyanide, an alkaline hydroxide, zinc and tin, the cyanide ion being present in a concentration less than required to complex all of the zinc as $Zn(CN)_4^=$, the total concentration of cyanide and hydroxide ion being sufficient to complex all of the zinc, the zinc concentration being between 5 and 50 grams per liter, and the tin concentration being between 15 and 75 grams per liter.

5. A plating solution for electrolytically forming a zinc-tin alloy containing about 87 percent zinc comprising sodium cyanide, sodium hydroxide, zinc and tin, the cyanide ion being present in a concentration less than required to complex all of the zinc as $Zn(CN)_4^=$, the total concentration of cyanide and hydroxide ion being sufficient to complex all of the zinc, the zinc concentration being between 5 and 50 grams per liter and the tin concentration being between 15 and 75 grams per liter.

6. A plating solution for electrolytically forming a zinc-tin alloy containing about 87 percent zinc comprising potassium cyanide, potassium hydroxide, zinc and tin, the cyanide ion being present in a concentration less than required to complex all of the zinc as $Zn(CN)_4^=$, the total concentration of cyanide and hydroxide ion being sufficient to complex all of the zinc, the zinc concentration being between 5 and 50 grams per liter and the tin concentration being between 15 and 75 grams per liter.

7. A process for the electrolytic deposition of a solderable zinc-tin alloy containing in excess of 87 percent zinc including the steps of subjecting an article to be plated, as cathode, to electrolysis in a plating bath containing 5 to 50 grams per liter of zinc, 15 to 75 grams per liter of tin and both cyanide and hydroxide ion, the cyanide ion being present in an amount insufficient to complex all of the zinc as cyanozincate ion, the total cyanide and hydroxide ion concentration being sufficient to complex all of the zinc, while maintaining an average current density of 20 to 40 amperes per square foot and a plating bath temperature of approximately 65° C.

8. A process for the electrolytic deposition of a solderable zinc-tin alloy containing about 87 percent zinc including the steps of subjecting an article to be plated, as cathode, to electrolysis in a plating bath containing 5 to 50 grams per liter of zinc, 15 to 75 grams per liter of tin and sodium cyanide and sodium hydroxide, the cyanide ion being present in an amount insufficient to complex all of the zinc as cyanozincate ion, the total cyanide and hydroxide ion concentration being sufficient to complex all of the zinc, while maintaining an average current density of 5 to 40 amperes per square foot and a plating bath temperature of approximately 65° C.

9. A process for the electrolytic deposition of a solderable zinc-tin alloy containing about 87 percent zinc including the steps of subjecting an article to be plated, as cathode, to electrolysis in a plating bath containing 5 to 50 grams per liter of zinc, 15 to 75 grams per liter of tin and potassium cyanide and potassium hydroxide, the cyanide ion being present in an amount insufficient to complex all of the zinc as cyanozincate ion, the total cyanide and hydroxide ion concentration being sufficient to complex all of the zinc, while maintaining an average current density of 20 to 100 amperes per square foot and a plating bath temperature of approximately 65° C.

10. A zinc-tin alloy plating bath made up of zinc, tin, and sodium salts comprising sodium hydroxide and sodium cyanide, in which the total sodium hydroxide content in grams per liter is not less than 2.44 times the zinc content of the bath in grams per liter minus ⅓ the total sodium cyanide present in grams per liter.

11. A zinc-tin alloy plating bath made up of zinc, tin, and potassium salts comprising potassium hydroxide and potassium cyanide, and which contains potassium hydroxide in grams per liter not less than 3.43 times the zinc content of the bath in grams per liter minus ¼ the total potassium cyanide content in grams per liter.

12. An alloy plating bath made up of zinc, tin, a source of hydroxide ions and a cyanide, whose total cyanide content is less than the amount required to complex all of the zinc as $Zn(CN)_4^=$, the zinc content lying between 5 and 50 grams per liter and the tin content lying between 15 and 75 grams per liter.

13. A zinc-tin alloy plating bath made up of zinc, tin, and sodium salts comprising sodium hydroxide and sodium cyanide, in which the sodium cyanide content of the bath lies above zero and below three times the zinc metal content and in which the zinc content lies between 5 and 50 grams per liter and the tin content lies between 15 and 75 grams per liter.

14. A zinc-tin alloy plating bath made up of zinc, tin, and potassium salts comprising potassium hydroxide and potassium cyanide, in which the potassium cyanide content of the bath lies above zero and below three times the zinc metal content and in which the zinc content lies between 5 and 50 grams per liter and the tin content lies between 15 and 75 grams per liter.

15. A zinc-tin alloy plating bath made up of zinc, tin, and sodium salts comprising sodium hydroxide and sodium cyanide, and in which the total sodium hydroxide content in grams per liter is not less than 2.44 times the zinc content of the bath in grams per liter minus ⅓ the total sodium cyanide present in grams per liter, the zinc content lying between 5 and 50 grams per liter and the tin content lying between 15 and 75 grams per liter.

16. A zinc-tin alloy plating bath made up of zinc, tin, and potassium salts comprising potassium hydroxide and potassium cyanide, and which contains potassium hydroxide in grams per liter not less than 3.43 times the zinc content of the bath in grams per liter minus ¼ the total potassium cyanide content in grams per liter, the zinc content lying between 5 and 50 grams per liter and the tin content lying between 15 and 75 grams per liter.

17. A plating solution for electrolytically forming a zinc-tin alloy containing between 75 and 95 percent zinc comprising an alkaline cyanide, an alkaline hydroxide, zinc and tin, the cyanide ion being present in a concentration less than that required to complex all of the zinc as cyanozincate ion and in a concentration greater than five grams per liter, the total concentration of cyanide and hydroxide ion being sufficient to complex all of the zinc, the zinc concentration being between the limits of 5 to 50 grams per liter and the tin concentration being between the limits of 15 to 75 grams per liter.

18. A plating solution for electrolytically forming a zinc-tin alloy containing between 75 and 95 percent zinc comprising sodium cyanide, sodium hydroxide, zinc and tin, the cyanide ion being present in a concentration less than that required to complex all of the zinc as cyanozincate ion and in a concentration greater than ten grams per liter, the total concentration of cyanide and hydroxide ion being sufficient to complex all of the zinc, the zinc concentration being between the limits of 5 to 50 grams per liter and the tin concentration being between the limits of 15 to 75 grams per liter.

19. A plating solution for electrolytically forming a zinc-tin alloy containing between 75 and 95 percent zinc comprising potassium cyanide, potassium hydroxide, zinc and tin, the cyanide ion being present in a concentration less than that required to complex all of the zinc as cyanozincate ion and in a concentration greater than thirteen grams per liter, the total concentration of cyanide and hydroxide ion being sufficient to complex all of the zinc, the zinc concentration being between the limits of 5 to 50 grams per liter and the tin concentration being between the limits of 15 to 75 grams per liter.

20. A process for the electrolytic deposition of a solderable zinc-tin alloy containing from 75 to 95 percent zinc and 5 to 25 percent tin including the steps of subjecting an article to be plated, as cathode, to electrolysis in a plating bath containing 5 to 50 grams per liter of zinc, 15 to 75 grams per liter of tin, and cyanide and hydroxide ion, the cyanide ion being present in an amount less than that required to complex all of the zinc as cyanozincate ion and in an amount greater than five grams per liter, the total cyanide and hydroxide ion concentration being sufficient to complex all of the zinc, while maintaining a current density of between five and one hundred amperes per square foot, and a plating bath temperature of between 45° C. and 85° C.

21. A process for the electrolytic deposition of a solderable zinc-tin alloy containing from 75 to 95 percent zinc and 25 to 5 percent tin including the steps of subjecting an article to be plated, as cathode, to electrolysis in a plating bath containing 5 to 50 grams per liter of zinc, 15 to 75 grams per liter of tin, sodium cyanide and sodium hydroxide, the sodium cyanide being present in an amount less than that required to complex all of the zinc as cyanozincate ion and in an amount greater than ten grams per liter, the total cyanide and hydroxide concentration being sufficient to complex all of the zinc, while maintaining a current density of five to forty amperes per square foot, and a plating bath temperature of between 45° C. and 85° C.

22. A process for the electrolytic deposition of a solderable zinc-tin alloy containing from 75 to 95 percent zinc and 25 to 5 percent tin including the steps of subjecting an article to be plated, as cathode, to electrolysis in a plating bath containing 5 to 50 grams per liter of zinc, 15 to 75 grams per liter of tin, potassium cyanide and potassium hydroxide, the potassium cyanide being present in an amount less than that required to complex all of the zinc as cyanozincate ion and in an amount greater than thirteen grams per liter, the total cyanide and hydroxide concentration being sufficient to complex all of the zinc, while maintaining a current density of twenty to one hundred amperes per square foot, and a plating bath temperature of between 45° C. and 85° C.

References Cited in the file of this patent

UNITED STATES PATENTS

| | | |
|---|---|---|
| 1,904,732 | Haueisen et al. | Apr. 18, 1933 |
| 2,600,352 | Wernlund | June 10, 1952 |
| 2,675,347 | Lowenheim | Apr. 13, 1954 |

FOREIGN PATENTS

| | | |
|---|---|---|
| 511,841 | Belgium | Dec. 3, 1952 |
| 548,009 | Great Britain | Sept. 21, 1942 |